(12) United States Patent
Howe

(10) Patent No.: US 8,555,556 B1
(45) Date of Patent: Oct. 15, 2013

(54) RESERVOIR WITH REMOVABLE COVER AND A COVER-WINDING GAP UNDER THE HANDRAIL THEREOF

(71) Applicant: Geomembrane Technologies Inc., Fredericton (CA)

(72) Inventor: Brent Howe, Fredericton (CA)

(73) Assignee: Geomembrane Technologies Inc, Fredericton, N.B. (CA)

( * ) Notice: Subject to any disclaimer, the term of this patent is extended or adjusted under 35 U.S.C. 154(b) by 0 days.

(21) Appl. No.: 13/694,347

(22) Filed: Nov. 23, 2012

(51) Int. Cl.
*E04B 1/12* (2006.01)
*E04H 15/00* (2006.01)
*E04H 15/18* (2006.01)

(52) U.S. Cl.
USPC .............. 52/63; 52/23; 52/169.7; 52/222; 52/DIG. 12; 4/498; 4/503; 4/504; 242/919

(58) Field of Classification Search
USPC ........... 52/23, 63, 82, 169.7, 169.8, 222, 498, 52/500, 502–504, 174, 182, 64, 86, 52/DIG. 12; 256/59, 64, 12.5, 13, 1; 242/919
See application file for complete search history.

(56) References Cited

U.S. PATENT DOCUMENTS

| | | | | |
|---|---|---|---|---|
| 3,002,493 A * | 10/1961 | Galamba | ..................... | 119/514 |
| 4,001,900 A * | 1/1977 | Lamb | ................ | 4/498 |
| 4,459,711 A * | 7/1984 | Sartain et al. | .................... | 4/502 |
| 4,821,679 A * | 4/1989 | Hackert | ...................... | 119/502 |
| 4,823,524 A * | 4/1989 | Bednar | ......................... | 52/182 |
| 6,389,757 B1 | 5/2002 | DeGarie | | |
| 6,450,124 B1 * | 9/2002 | Calvert et al. | ................ | 119/512 |
| 6,854,426 B2 * | 2/2005 | Campbell et al. | ............ | 119/513 |
| 6,871,362 B1 | 3/2005 | Zell | | |
| 6,966,984 B1 | 11/2005 | Solomon | | |
| 2001/0023506 A1 * | 9/2001 | Mathis et al. | .................... | 4/502 |
| 2003/0146426 A1 * | 8/2003 | Ray et al. | ....................... | 256/59 |
| 2003/0172597 A1 * | 9/2003 | Folkema | ......................... | 52/23 |
| 2005/0097834 A1 * | 5/2005 | King et al. | ................... | 52/169.7 |

* cited by examiner

*Primary Examiner* — Brian Glessner
*Assistant Examiner* — Brian D Mattei
(74) *Attorney, Agent, or Firm* — Mario Theriault

(57) ABSTRACT

The reservoir includes a flexible cover laid thereon. A transverse walkway extends along an end thereof. A transverse handrail is mounted along the walkway, along an inside edge of the walkway. A cover-winding gap extends under the handrail and above the walkway. This cover-winding gap extends in a plane of the handrail. The cover-winding gap extends unobstructed under the handrail and above the walkway and along the full width of the reservoir. Because of this cover-winding gap, the flexible cover can be wound up in a spool in one stride across the reservoir.

17 Claims, 2 Drawing Sheets

US 8,555,556 B1

RESERVOIR WITH REMOVABLE COVER AND A COVER-WINDING GAP UNDER THE HANDRAIL THEREOF

FIELD OF THE INVENTION

This invention pertains to reservoirs having flexible covers mounted thereon, and more particularly, it pertains to reservoirs having flexible covers that are rolled up to one side for giving access to the equipment mounted inside the reservoirs.

BACKGROUND OF THE INVENTION

The type of reservoir that is of interest herein is best described in U.S. Pat. No. 6,389,757 issued to C. J. DeGarie on May 21, 2002. This document describes an industrial clarifier that has a flexible membrane-type cover mounted thereon. The cover is supported over a reservoir by a series of arched pipes spanning across the reservoir. When access inside the reservoir is needed, for maintenance of equipment inside the reservoir for example, the cover is rolled up on a mandrel to one side of the reservoir. The rolling up of the cover on a mandrel is done by hand; by hand crank, or by using a powered tool connected to the end of the mandrel. A spool of cover material is formed by winding the fabric over the mandrel while the mandrel is rolled across the reservoir.

In order to ensure the safety of workers, a handrail and a kick plate are required around the perimeter of the reservoir. The presence of these handrails makes it difficult to wind up the cover, by hand or by using a hand crank. It will be appreciated that the winding of the cover must be interrupted at every post supporting the transverse handrails. Such interruption in the winding motion is required to allow one's arms to reach over every post supporting the handrails. When a power tool is used, the tool must be stopped and disconnected from the mandrel, and reconnected past every post supporting the handrails.

Therefore, there is a need in the field of reservoirs for a better installation so that a cover can be wound up in one stride across a reservoir, while maintaining the safety of the personnel working around the reservoir.

SUMMARY OF THE INVENTION

In the present invention, there is provided a reservoir having post-less transverse handrails whereby a flexible cover can be wound up in one stride across the reservoir, without interruption.

In a first aspect of the present invention, there is provided a reservoir having a flexible cover laid thereon. A transverse walkway extends along an end of the reservoir. A transverse handrail is mounted to the walkway, along an inside edge of the walkway relative to the reservoir. A cover-winding gap extends under the handrail. This cover-winding gap extends in a plane of the handrail. This cover-winding gap extends unobstructed under the handrail and above the walkway along the full width of the reservoir. Because of this cover-winding gap, the flexible cover can be wound up in a spool in one stride across the reservoir.

In another aspect of the reservoir of the present invention, the transverse handrail has a truss-like structure that is arched upwardly. This structure has an inherent resistance against sagging.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which.

DESCRIPTION OF THE PREFERRED EMBODIMENT

Figure 1:
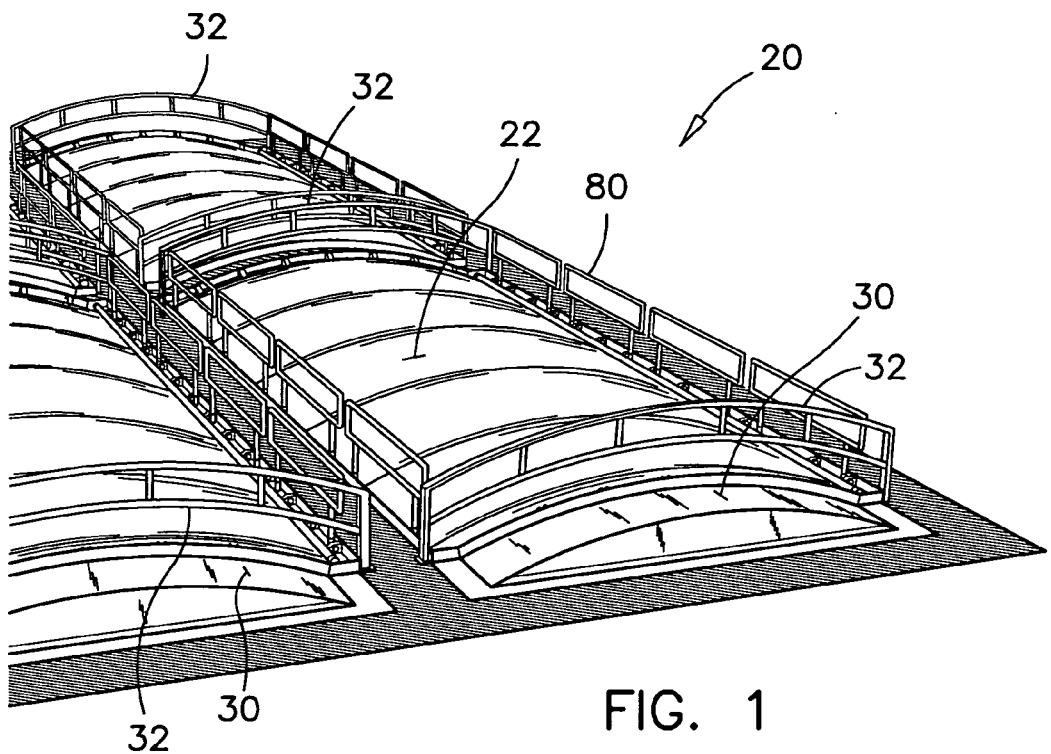
FIG. 1 is a perspective view of several preferred reservoirs mounted side-by-side and end-to-end.

Referring firstly to FIG. 1, each preferred reservoir 20 has a rectangular shape and is covered by a flexible, membrane-like cover 22. As it may be understood from this drawing, the flexible cover 22 is supported above the reservoir by a series of arched frame members (not shown). The illustration shows two reservoirs laid out end-to-end, and partial illustrations of two additional reservoirs mounted side-by-side with the first-mentioned ones. This illustration shows a clarifier installation for purifying waste water of an industrial plant for example. Additional structure and function of a typical clarifier installation are described in the previously-mentioned U.S. Pat. No. 6,389,757 issued to C. J. DeGarie. This document is incorporated herein by reference.

Figure 2:
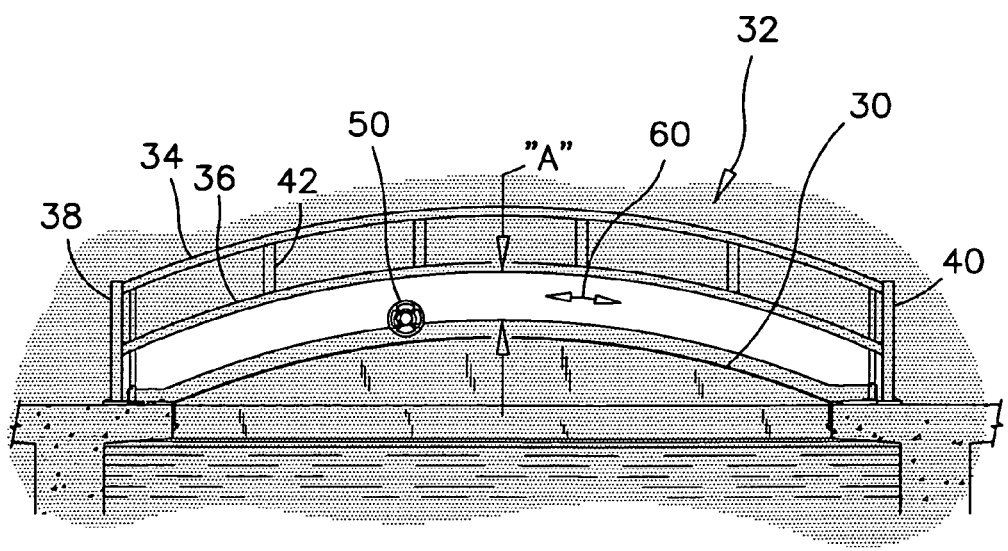
FIG. 2 is an elevation view of the end of the preferred reservoir showing the cover-winding gap under the handrail thereof.

For reference purposes, each reservoir is enclosed by walkways and handrails. The walkways on both ends of a reservoir 20 have an upward curvature. The walkways on the ends of a reservoir are referred to herein as the transverse walkways 30. The handrail along each transverse walkway 30 also has an upward curvature, as can be seen in FIG. 2. The preferred handrail along a transverse walkway 30 is referred to herein as a transverse handrail 32. The transverse handrail 32 is mounted along the inside edge of the transverse walkway 30 closer to the reservoir. When the walkway 30 is mounted between two reservoirs set end-to-end, it has transverse handrails 32 mounted on both sides thereof.

In a preferred reservoir installation, a transverse handrail 32 is made of a first and second arched rails 34, 36 respectively, and two posts 38, 40, one at each end thereof. The transverse handrail 32 also has a truss-like structure with cross-members 42, providing sufficient stiffness for ensuring the safety of workers. The posts 38, 40 are mounted at each end of the transverse walkway 30 and are solidly anchored to the sides of the reservoir to resist both longitudinal and transverse forces.

The lower rail 36 of the handrail 32 is vertically spaced from the surface of the transverse walkway 30 a sufficient distance "A" for allowing a spool 50 of membrane fabric to be rolled thereunder across the full width of the reservoir. The opening defined by dimension "A" across the width of the reservoir is referred to herein as the cover-winding gap 60. The curvature of the lower rail 36 is preferably the same as the curvature of the transverse walkway 30 such that the cover-winding gap 60 has a uniform height across the reservoir.

Figure 3:
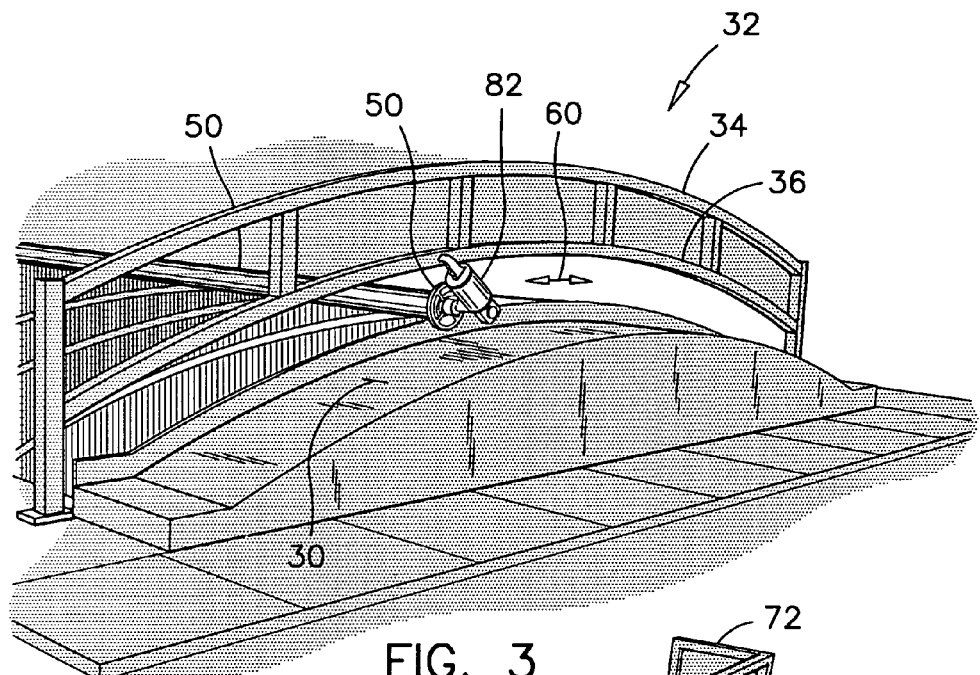
FIG. 3 is a perspective end view of the reservoir as shown in FIG. 2.

The expression "cover-winding gap" is used herein because this opening allows a spool 50 of fabric material to be rolled up across the reservoir without interruption, even when the end of the spool 50 overlaps the walkway 30 under that handrail 32, as shown in FIG. 3.

Although the arched structure of the preferred transverse handrail 32 is advantageous for offering an inherent self-supporting feature, it will be appreciated that the transverse handrail 32 needs not to have an upward curvature. Similarly, the transverse walkway 30 can be flat. In that case, the transverse handrail 32 may be horizontally straight across the reservoir if desired. Also, the lower rail 36 may be curved and the top rail 34 may be horizontally straight across, depending on the circumstances and the designer's choice.

Figure 4:
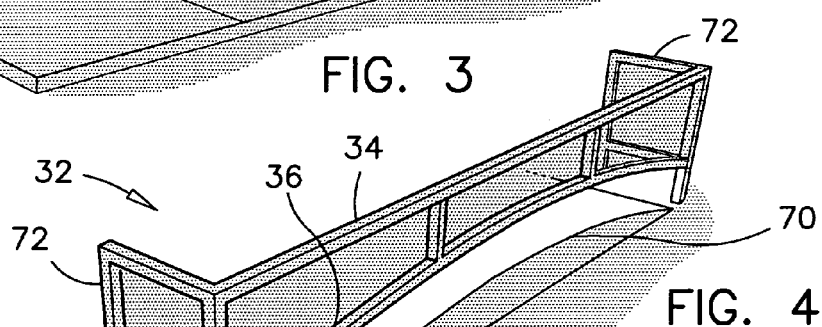
FIGS. 4 and 5 illustrate two variants of handrails with cover-winding gaps.
Figure 5:
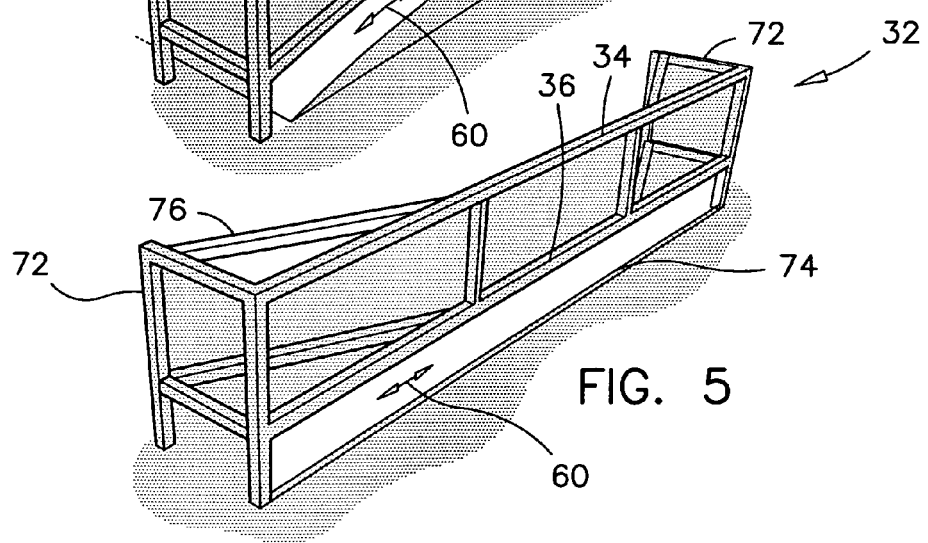

FIGS. 4 and 5 show variants of handrails 32 with the preferred cover-winding gap 60 thereunder. The illustrations in FIGS. 2 to 5 have been shaded to better emphasize the representation of the cover-winding gap 60.

In FIG. 4, the lower rail 36 has an upward curvature to follow a curved cover structure 70. The top rail 34 is horizontally straight. When the handrail 32 extends across a wide reservoir, it may be advantageous to include right-angle return frames 72 one at each end, to strengthen the handrail 32.

Another variant of handrail 32 with a cover-winding gap 60 is shown in FIG. 5. Both the top and bottom rails 34, 36 are horizontally straight to accommodate a reservoir having a flat cover structure 74 for example.

Diagonal braces 76 may be added to the return frames 72 to further strengthen long handrails 32. As it may be appreciated, the return frames 72 and the diagonal braces 76 may be incorporated into the curved handrail 32 as shown in FIGS. 1-3.

The overall height of the transverse handrail 32 is a standard height of about forty-two inches. For reference purposes the height of the preferred transverse handrail 32 is about the same as the height of the longitudinal handrails 80 along the sides of the reservoir. The cover-winding gap 60 under the transverse handrail 32 preferably has a height "A" of about twelve to twenty-four inches.

Referring back to FIG. 3, the cover-winding gap 60 under the transverse handrail 32 is advantageous for allowing a worker to walk along the transverse walkway 30 while carrying a power wrench 82 for example directly above the transverse walkway 30, for winding the spool 50 of fabric cover along the cover-winding gap 60.

Although the cover-winding gap 60 described herein is illustrated under a transverse handrail 32 along a walkway 30 at the end of a reservoir, it will be appreciated that the same arrangement can also be found under the handrails bordering an intermediate walkway (not shown), extending across the centre of a long reservoir for example. The cover-winding gaps 60 in this case would allow the spool 50 of cover material to roll there along while being wound across the reservoir.

As to further construction details, and other method of use of the reservoir with a cover-winding gap, these details should be apparent to those skilled in the art, and accordingly, further description relative to these aspects is deemed unnecessary.

What is claimed is:

1. A reservoir having sides and ends, comprising;
   a flexible cover laid thereon;
   a transverse walkway mounted along one of said ends;
   a transverse handrail mounted along said transverse walkway, along an inside edge of said transverse walkway;
   a cover-winding gap extending under said transverse handrail and above said transverse walkway; said cover-winding gap comprising an opening extending unobstructed between said transverse handrail and said transverse walkway, and along a full width of said reservoir, and;
   a spool connected to said flexible cover and extending along a length of said reservoir, said spool having an end portion extending through said cover-winding gap and over said walkway; said spool being movable along said cover-winding gap for winding said flexible cover thereon.

2. The reservoir as claimed in claim 1 wherein said cover-winding gap extends in a plane of said transverse handrail.

3. The reservoir as claimed in claim 1 wherein said transverse handrail has an arched structure.

4. The reservoir as claimed in claim 1, wherein said transverse handrail has a truss-like structure.

5. The reservoir as claimed in claim 1, further including a power wrench mounted to said end portion of said spool.

6. The reservoir as claimed in claim 5, wherein said power wrench is mounted directly above said transverse walkway.

7. The reservoir cover as claimed in claim 1, wherein said cover-winding gap has a height of between twelve to twenty-four inches.

8. The reservoir as claimed in claim 7, wherein said transverse handrail has an overall height of about forty-two inches.

9. A reservoir having sides and ends, comprising;
   a flexible cover laid thereon;
   a transverse walkway mounted along one of said ends;
   a longitudinal handrail mounted along one of said sides;
   a transverse handrail mounted along said transverse walkway, along an inside edge of said transverse walkway; said transverse handrail having an arched truss-like structure;
   a cover-winding gap extending under said transverse handrail and above said transverse walkway; said cover-winding gap comprising an opening extending unobstructed between said transverse handrail and said transverse walkway and along a full width of said reservoir, and;
   a spool connected to said flexible cover and extending along a length of said reservoir, said spool having an end portion extending through said cover-winding gap and over said walkway; said spool being movable along said cover-winding gap for winding said flexible cover thereon.

10. The reservoir as claimed in claim 9, wherein said cover-winding gap extends in a plane of said transverse handrail.

11. The reservoir as claimed in claim 9, further including a power wrench mounted to said end portion of said spool, directly above said transverse walkway.

12. The reservoir cover as claimed in claim 9, wherein said cover-winding gap has a height of between twelve to twenty-four inches.

13. The reservoir as claimed in claim 12, wherein said transverse handrail has a same overall height as said longitudinal handrail.

14. A reservoir having sides and ends, comprising;
    a flexible cover laid thereon;
    a transverse walkway mounted along one of said ends;
    a longitudinal handrail mounted along one of said sides;
    a transverse handrail mounted along said transverse walkway, along an inside edge of said transverse walkway; said transverse handrail having an arched truss-like structure, and a same height as said longitudinal handrail;
    a cover-winding gap extending under said transverse handrail and above said transverse walkway; said cover-winding gap comprising an opening extending unobstructed between said transverse handrail and said transverse walkway and along a full width of said reservoir, and;

a spool connected to said flexible cover and extending along a length of said reservoir, said spool having an end portion extending through said cover-winding gap and over said walkway; said spool being movable along said cover-winding gap for winding said flexible cover thereon.

15. The reservoir as claimed in claim 14, wherein said cover-winding gap extends in a plane of said transverse handrail.

16. The reservoir as claimed in claim 14, wherein said cover-winding gap has a height of between twelve to twenty-four inches.

17. The reservoir as claimed in claim 14, and further including a power wrench mounted to said end portion of said spool, directly above said transverse walkway.

\* \* \* \* \*